Patented Feb. 27, 1934

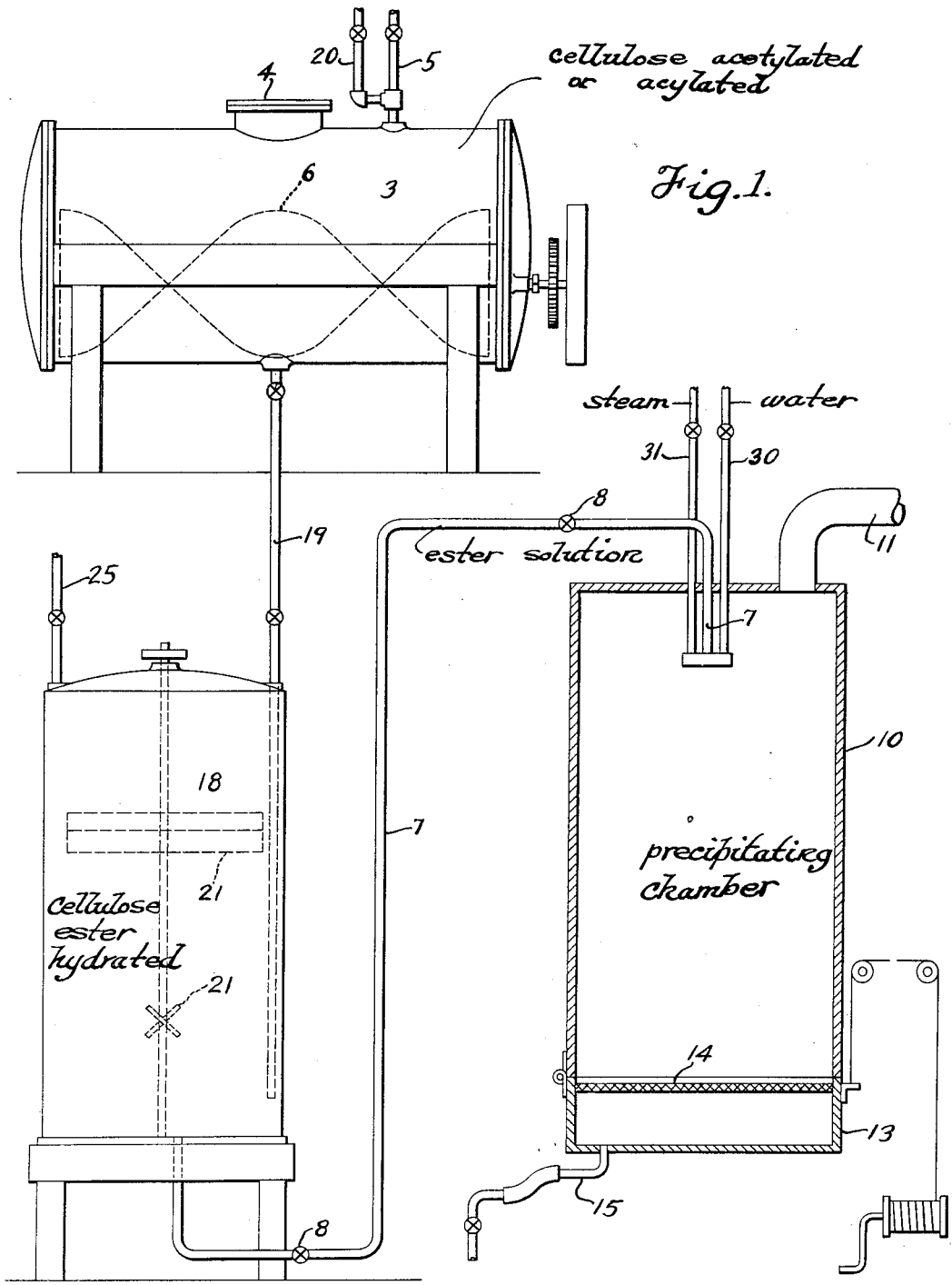

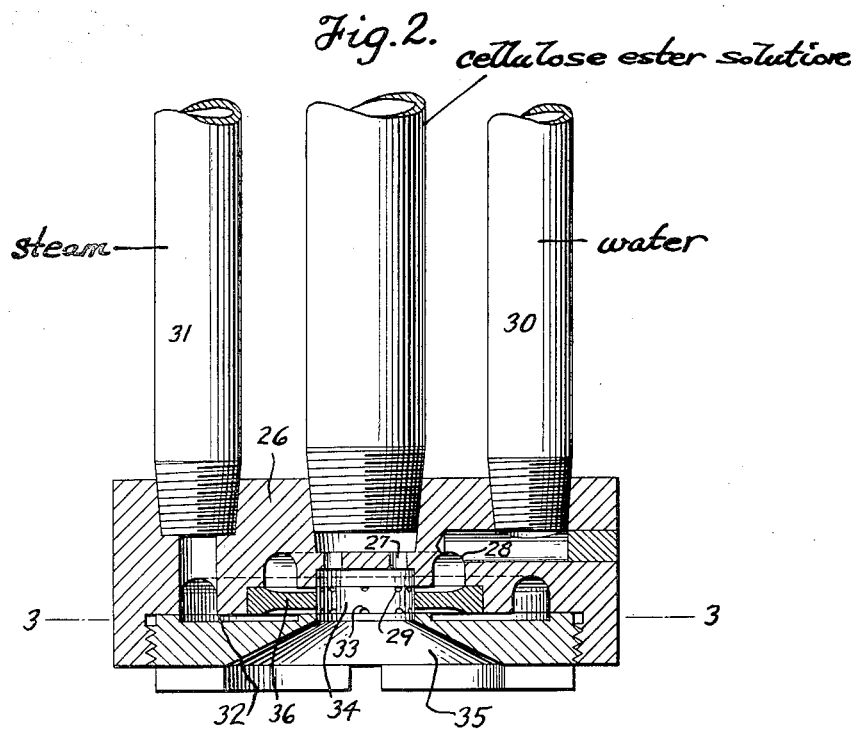
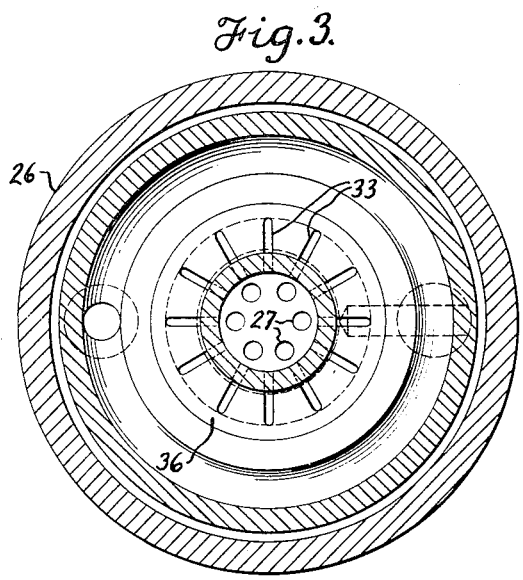

1,949,213

UNITED STATES PATENT OFFICE 1,949,213

PRECIPITATION OF CELLULOSE ESTERS

Donald B. Mason, Catonsville, Md., assignor to U. S. Industrial Alcohol Co., New York, N. Y., a corporation of West Virginia Application May 10, 1929. Serial No. 362,105

21 Claims. (Cl. 260—102)

My invention relates to the manufacture and treatment of cellulose esters of organic acids, such as cellulose acetate, cellulose propionate and cellulose benzoate, in order to obtain the same in a physical condition favorable for subsequent treatments.

The object of my invention is to precipitate, or to make and precipitate, such cellulose esters in such a way that the product is light and loose, and can be easily washed, dried, bleached, put into solution for eventual use, or otherwise treated. Another object is to accomplish the precipitation with a minimum of precipitating liquid. Still another object is to reduce the expense of the recovery of any acid or other values which may be present.

The standard practice for the precipitation of such cellulose esters is to pour their solutions, or reaction mixtures, into a body of precipitating liquid.

In the patents of Lloyd M. Burghart, No. 1,816,564, dated July 28, 1931, No. 1,822,563, dated Sept. 8, 1931, and No. 1,839,295, dated Jan. 5 1932, methods are disclosed of making and treating cellulose esters, for example cellulose acetate, in which liquid sulfur dioxid is employed as a reaction medium or as a solvent.

Briefly, cellulose acetate can be made by reacting cellulose, or a cellulose derivative such as hydrocellulose, in a closed pressure vessel, with a suitable acetylating agent, typically though not necessarily acetic anhydride, in the presence of liquid sulfur dioxid as a reaction medium, sulfuric acid or some other catalyst or condensing agent being preferably employed in accordance with usual practice.

The chloroform-soluble or alcohol-chloroform-soluble cellulose acetate made in this way may be precipitated, washed and dried. Cellulose acetate of some other type of solubility, such as the acetone-soluble form or one readily soluble in acetic ether (ethyl acetate), is at present more desirable, and to secure that result the reaction mixture resulting from the acetylation reaction is usually subjected to a hydration treatment, after which the mixture is precipitated to separate the cellulose acetate from the other constituents of the solution or fluid mixture, in condition for subsequent treatment and utilization.

In the Burghart patents it is disclosed that by discharging such reaction mixtures, in which the cellulose acetate is dispersed in the liquid sulfur dioxid, into contact with a precipitating liquid under such conditions that the sulfur dioxid is abruptly released as gas from within the precipitating cellulose ester, a loose product possessing a physical structure favorable for all subsequent treatments is obtainable. It was also disclosed that the plan was not limited to the original manufacture of cellulose esters, since already manufactured products could be dissolved in liquid sulfur dioxid and then precipitated from solution in a corresponding manner, also that "primary" cellulose acetate however produced could be hydrated in liquid sulfur dioxid and then precipitated in such manner as to open up the ester masses.

My invention makes use of the Burghart discoveries and provides an improved method of precipitation of cellulose acetate and other cellulose esters of organic acids, so as to obtain them in, or put them into, still lighter and looser physical condition, having the advantageous capabilities in respect to subsequent treatment which have been referred to, and/or to obtain such results in an easier, more certain manner, insuring uniformity in the product, and also securing the other advantages which have been outlined.

The invention is of special advantage in connection with the employment of liquid sulfur dioxid as a reaction medium or as a solvent, since sulfur dioxid exists as a gas under ordinary conditions and therefore constitutes an ideal means for disrupting and expanding the cellulose ester product as it is being precipitated. However, my invention is not necessarily limited to the use of liquid sulfur dioxid, since it affords a way in which less volatile solvents can be vaporized or gasified in the step of precipitating cellulose esters to secure light, uniform and readily treatable products.

My invention relates, therefore, to a method for precipitating cellulose acetate and like cellulose esters from reaction mixtures or solutions in which the cellulose ester is suspended or dispersed, completely on incompletely, in a liquid medium, the bulk of which, or a substantial constituent of which, is capable of being abruptly gasified or vaporized at temperatures which will not injure the cellulose ester and thereby yield a relatively enormous volume of gaseous expanding agent, under the conditions of precipitation herein described. An important feature of this method and apparatus is that a stream or jets of the reaction mixture or solution issuing under pressure are commingled, at the region of release, with a stream or jets of liquid acting as a precipitant or coagulant for the cellulose ester, sufficient heat being supplied to compensate for the latent heat of vaporization and to insure the abrupt release of the gas or vapors from within the precipitating material.

In this way the cellulose ester can be precipitated in a regular and uniform manner in a notatably loose or fibrous condition, without the production of lumps requiring to be comminuted, and with the least amount of attention. Also, owing to the limited amount of water or other precipitating liquid employed, dilution of the acetic acid and other values which may be present is correspondingly reduced.

The heat may be conveyed by the water or other precipitating liquid itself, or other methods of heating, direct or indirect, may be employed, but preferably a jet or jets of steam or other hot vapor are introduced into the mixture, such vapor being preferably also a coagulant. Best results have been secured when the issuing cellulose ester solution is encountered first by the liquid precipitating jets and then by the vapor jets, though this may be varied.

The apparatus for performing these operations includes a nozzle or combination of nozzles arranged to effect the desired commingling of the streams and the disruption of the cellulose ester masses as they are being coagulated or precipitated. The particular design may be widely varied. The nozzle part which provides the exit for the cellulose ester reaction mixture or solution is connected by a pipe with a closed reaction chamber or vessel where the solution or mixture is held under pressure, this pipe being provided with one or more valves which are kept closed until the mixture is ready to be discharged, and which when opened allow the mixture to escape into an enclosed precipitation and expansion chamber provided with an offtake for collecting and leading away the gas or vapor generated from one or more constituents of the liquid medium in which the cellulose ester is colloidally dispersed or suspended. The nozzle part which delivers the jet or jets of liquid precipitant is connected through a valve with a source of such liquid under suitable pressure, for example a water distribution system. The vapor jet or jets are likewise connected through a valve with a suitable source of supply of steam or other vapor.

The pressure inside the precipitation chamber should be relatively low, though it may be above atmospheric pressure. It is convenient that the pressure at this region be approximately atmospheric, but obviously a reduced pressure may be maintained if desired.

The effect of securing a product in a uniformly light, fluffy or fibrous condition is presumably due in part to the mechanical disintegrating effect of the jets and in part to the sudden expansion of one or more of the constituents of the solution.

The operation not only improves the physical condition of the product by rendering it more easily washed and treated and more readily soluble, but also permits a minimum of precipitating agent to be used since there need be no dense masses which have to be precipitated by diffusion of the precipitating agent into the mass. For the same reasons, a minimum amount of washing is required to free the cellulose ester from traces of sulfuric acid or other catalyst and from other constituents of the solution. Due to these facts, the valuable constituents of the liquid wetting the precipitated cellulose ester are of such concentration as to render their ultimate recovery and precipitation comparatively easy and inexpensive.

While water and steam are the cheapest and most convenient to use in the precipitation, it may be advantageous to use some other liquid and the same or another vapor from which the values may be more readily recovered than from water.

Another important feature of the invention has to do with a preparation of the cellulose ester reaction mixture or solution for precipitation, which consists in thoroughly incorporating therewith, before discharge, a considerable amount of water or other precipitating agent, the amount being sufficient to bring the mass toward or near to the precipitating point, without, however, jelling it to a degree which would prevent its flowing. By putting the solution into a labile condition before actual precipitation, the least total amount of precipitating liquid is required, and the precipitation of a light, uniform and easily treatable product is greatly facilitated. This step is of special advantage in connection with the jet precipitation constituting the other part of this invention, since the precipitating jets or streams are enabled to do their work with the greatest efficiency and without passing any large quantity of liquid. Indeed, it would even be possible to omit the jet or jets of liquid precipitant and to precipitate with steam or other vapor which would be condensed on contact with the cellulose ester mixture. In this direction, precipitation may be effected by jets of wet steam or vapor, consisting partly of vapor and partly of liquid.

However, I do not wish to limit the step of putting the solution or mixture into a condition approaching precipitation by the incorporation therein of a relatively large amount of precipitating agent preparatory to final precipitation, solely to precipitation brought about by the commingling of issuing jets, since a part of the advantage may be realized if the actual precipitation were accomplished by delivering the mixture or solution thus prepared into or beneath the surface of a body of precipitating liquid.

In the accompanying drawings illustrating a form of execution of the invention:

Fig. 1 is a view partly in elevation and partly in section of a preferred combination of apparatus for the manufacture and precipitation of cellulose acetate or other cellulose esters of organic acids;

Fig. 2 is a longitudinal section through a combination nozzle; and

Fig. 3 is a section on the line 3—3 of Fig. 2.

In Fig. 1, the numeral 3 designates a closed reaction vessel adapted to retain the required pressure, this vessel being provided with a cover 4 which can be tightly closed and can be removed, and with valved inlets 5 and 20 for introducing liquid materials. Within the vessel there is a stirrer 6 arranged to be driven by power. The cellulose or cellulose derivative is placed in the vessel through the opening which is ordinarily tightly closed by the cover 4, and the liquids for acetylation, or acylation, may be introduced through the valved inlet 5.

The vessel 3 is connected with another closed pressure vessel 18 by a valved pipe 19, through which the mixture can be transferred when the valves in this pipe are opened. This vessel is preferably provided with stirrers 21, and has another valved inlet pipe 25.

A discharge pipe 7, provided with one or more valves 8, leads to a precipitation and expansion chamber 10, this chamber being enclosed and having an offtake 11 for collecting and freely carrying away sulfur dioxid or other gas or vapor, for recovery. The chamber may have a hinged bottom 13 for receiving and discharging the precipitated cellulose ester, said bottom provided with a filter 14 and a valved pipe 15 for drawing off liquid, for separation and recovery.

The end of discharge pipe 7 is connected within the chamber 10 with a downwardly directed nozzle 26 (Figs. 2 and 3) having a wall at the end of the pipe perforated with numerous small exit orifices 27, preferably about one-eighth inch in diameter, through which the solution or reaction mixture is delivered in the form of jets. In or around the nozzle there is an annular water channel 28 having a ring of fine exit orifices 29 arranged to produce and direct inward water jets to strike the issuing jets of the solution. This channel is connected by a valved pipe 30 with a source of supply of water under pressure. This water may be cold or may be heated to a moderate temperature. A valved steam pipe 31 communicates with another chamber 32 in or adjacent the nozzle, this chamber having a ring of fine exit orifices 33 disposed a little below or beyond the water jet orifices 29 so as to cause steam jets to strike the issuing solution already commingled with the precipitating liquid.

The exterior space 34 where the fluids commingle may be surrounded by a wall as shown and may have a flaring mouth 35, and the orifices 29 and 33 may be conveniently provided by forming radial grooves in an annular plate 36, but the various details and arrangements may be varied as desired.

The material used for esterification may be cellulose in any suitable form, or a cellulose derivative, for example hydrocellulose, and the acetylation, or acylation, may be preceded by an appropriate pre-treatment.

The following is given as a specific example.

100 parts of cellulose, 260 parts of acetic anhydride as an acetylating agent, 1000 parts of liquid sulfur dioxid, and 3 parts of sulfuric acid as a catalyst or condensing agent, are digested in the vessel 3 at a suitable temperature, preferably at about 20°–30° C., and at corresponding pressure, until test shows that the reaction has proceeded to the desired degree.

The cellulose or cellulose derivative is placed in the vessel through the opening which is ordinarily tightly closed by the cover 4, and the liquid materials may be introduced through the valved inlet 5.

As indicated in the Burghart Patent No. 1,816,564, the proportions of the ingredients may be varied. The temperature may also be varied. The time required may vary from about 6 to 18 hours depending upon conditions, for example, the amount of the liquid medium employed in relation to the other ingredients, the temperature and the efficiency of the stirring mechanism.

During the course of the treatment the cellulose loses its original structure and the cellulose acetate apparently dissolves in the liquid sulfur dioxid, the result at the end of this stage of the operation being that of a thickish liquid or semi-fluid mass, practically homogeneous and readily flowable through pipes under pressure of the $SO_2$ gas or vapor; the precise consistency of the fluid mass or liquid varying according to the amount of liquid medium present and other conditions. It is difficult to say whether the condition is strictly that of a colloidal solution, dispersion or suspension, or whether the mass is a fluid mixture akin to these, but for practical purposes it can be regarded as a solution.

In the example given, it will be understood that the solution of cellulose acetate in liquid sulfur dioxid existing when the acetylation reaction has been carried to the desired point, contains also the small amount of catalyst, the surplus acetic anhydride and some acetic acid.

The length of time required for the hydration treatment will vary according to the temperatures used, the proportions and other operating conditions. Under any given set of conditions, the time to stop the treatment can be readily ascertained by taking test samples. If the acetone-soluble type of cellulose acetate is desired, treatment is stopped when test samples show the desired degree of acetone solubility. If the ethyl-acetate-soluble type is desired, the treatment is continued until test samples indicate that the cellulose acetate has been altered so that it has come to be readily soluble in that solvent. In general, other types of solubility can be obtained by carrying the hydration treatment to the proper point in each case.

The condition of the reaction mixture at the end of the hydration stage is usually more liquid than at the conclusion of the acetylation reaction.

Before discharging the reaction mixture from the hydration vessel a comparatively large amount of water or other coagulating agent is admitted through a valved pipe 25, the amount of this agent being sufficient to bring the mass fairly close to precipitation without actually producing the change which is ordinarily termed precipitation. In other words, the solution or jell must be sufficiently fluid to flow through the pipe 7 and out through the orifices 27 under the $SO_2$ or other pressure.

In the example given, 169 parts of water are thus added and are stirred in with the reaction mixture. With this water sodium acetate or some other suitable binding agent for strong acid is preferably introduced to neutralize the sulfuric acid or other catalyst present.

The cellulose acetate thus produced is usually the chloroform-soluble form, though the acetylation may be so conducted as to yield cellulose acetate which is soluble in a mixture of alcohol and chloroform.

After-hydration may be carried out in the acetylation vessel 3, but for operating convenience the contents of the vessel 3, containing the chloroform-soluble or alcohol-chloroform-soluble cellulose acetate, may be transferred through the valved conduit 19 into the pressure vessel 18, where the hydration treatment is effected. As is well understood, the amount of the hydrating agent or agents should be enough to break down the surplus acetic anhydride left from the acetylation treatment and leave a surplus of water, preferably on the order of 3%–5% of the reaction mixture.

The hydrating agent or mixture may be introduced into the vessel 18, but there is a practical advantage in admitting it to the mass in the vessel 3 shortly before the transfer of the contents to the vessel 18, advantage being thereby taken of the thorough mixing action of the stirrer of the acetylating vessel.

As a concrete example, 55 parts of water and 6 parts of sulfuric acid may be introduced through the valved connection 20 to the mixture in the vessel 3 about 20 minutes before the transfer is made, the mass being then run into the vessel 18 and being there digested, preferably with mild stirring by stirrers 21, for 18–36 hours, or longer, until test samples indicate the desired degree of acetone-solubility. This digestion may be carried out at a temperature around 65°–70° C., but preferably at lower temperatures around 45° C.

This water having been incorporated, the valves 8 are opened, and the water and steam are turned through the pipes 30 and 31. The reaction mixture is then delivered through the orifices 27 into the chamber 10 and is commingled with the water and steam jets, which preferably act on the mixture in succession, with the result that the solution is broken up, the cellulose acetate is coagulated, and the sulfur dioxid gas is abruptly liberated from within the precipitating material, rupturing the expanding globules. The precipitated material is continuously thrown clear of the nozzle by the jets of steam and water and falls into the lower part of the chamber where the liquid drains or is drawn off.

The result is a cellulose ester of uniform, very loose and quite fibrous structure, its physical condition such that it lends itself readily to all subsequent treatments. The fibrous form of the product has, of course, no relation to the original cellulose fibers, but is probably due to the effect of the jets and to the manner in which thin films of the ester produced and disrupted at the moment of coagulation collapse and arrange themselves under these conditions of precipitation.

The product is finished by washing and drying in a suitable manner, or with any other treatments that may be desired at this time.

If cellulose acetate of the chloroform-soluble or alcohol-chloroform-soluble type, that is to say "primary" cellulose acetate, should be desired, it may be discharged and precipitated directly from the vessel 3 at the conclusion of the acetylation reaction. It has not been thought necessary to illustrate this. In that case, also, the water or other precipitating liquid, somewhat short of the amount required for definite precipitation, carrying also the acid binding reagent if desired, would be incorporated in the reaction mass preparatory to discharging and precipitating it in the manner described.

It will be understood that the invention is not limited to the agents which have been named in connection with acetylation and hydration. For example, acetic anhydride may be substituted by acetyl chlorid as the acetylating agent. Other known catalysts can be used in place of sulfuric acid for either acetylation or hydration or both.

The hydration agent may be water, or a mixture of water and alcohol, alcohol alone, or an aqueous solution of acetic acid, or any other suitable agent.

The invention may also be employed in connection with the hydration of primary cellulose acetate produced by any acetylation process.

The sulfur dioxid need not necessarily be present as a medium during acetylation or hydration, since it may be added to the reaction mixture before discharging and precipitation.

It is especially advantageous to employ liquid sulfur dioxid as the reaction and/or expanding medium, but the reaction medium may consist of a mixture of sulfur dioxid (in sufficiently large amount) and acetic acid added as such. Finally, the use of other less volatile liquids, as expanding and disrupting media is not excluded.

Other cellulose esters of organic acids can be formed by using the anhydrides or halides of the corresponding acids as acylating agents, and can then, or following an after-hydration, be precipitated in accordance with this invention, to obtain products having the desired physical condition and behavior in respect to subsequent treatment.

Furthermore, the mode of precipitation is well adapted for the re-treatment of already manufactured cellulose esters of this class. Thus, cellulose acetate, cellulose propionate, etc., previously completely manufactured by any process, can be put in solution in liquid sulfur dioxid in a closed pressure vessel and can then be discharged and precipitated in the manner and by the means set forth, to improve its physical condition. In such an application of the invention it is likewise desirable to add and mix with the solution before discharging it the amount of water or other precipitating liquid which will bring the solution near but not actually to the precipitating point.

Instead of water, non-aqueous precipitating liquids, such as carbon tetrachlorid, benzene, toluene and the like may be employed, and instead of steam the heated vapors of such liquids may be utilized; also expanding media more (or even less) volatile than sulfur dioxid may be employed.

I claim:

1. The method of obtaining cellulose esters of organic acids in easily treatable condition, which comprises producing a solution or like state of the cellulose ester dispersed in liquid sulfur dioxid, discharging a stream of the same under pressure, and commingling with such stream a stream of precipitating liquid, under such conditions as to vaporize and release the sulfur dioxid as the cellulose ester is thus precipitated.

2. The method of obtaining cellulose esters of organic acids in easily treatable condition, which comprises producing a solution or like state of the cellulose ester dispersed in liquid sulfur dioxid, discharging a stream of the same under pressure, and commingling with such stream a stream of heated precipitating liquid, under such conditions as to vaporize and release the sulfur dioxid as the cellulose ester is thus precipitated.

3. The method of obtaining cellulose esters of organic acids in easily treatable condition, which comprises producing a solution or like state of the cellulose ester dispersed in liquid sulfur dioxid, discharging a stream of the same under pressure, and commingling with such stream streams of precipitating liquid and hot vapor, under such conditions as to vaporize and release the sulfur dioxid as the cellulose ester is thus precipitated.

4. The method of obtaining cellulose esters of organic acids in easily treatable condition, which comprises producing a solution or like state of the cellulose ester dispersed in liquid sulfur dioxid, discharging a stream of the same under pressure, and directing jets of precipitating liquid and hot vapor to strike said stream in the order named.

5. The method of obtaining cellulose acetate in easily treatable condition, which comprises producing a solution or like state of the cellulose acetate dispersed in liquid sulfur dioxid, discharging a stream of the same under pressure, and commingling with such stream a stream of heated precipitating liquid, under such conditions as to vaporize and release the sulfur dioxid as the cellulose acetate is thus precipitated.

6. The method of obtaining cellulose acetate in easily treatable condition, which comprises producing a solution or like state of the cellulose acetate dispersed in liquid sulfur dioxid, discharging a stream of the same under pressure, and commingling with such stream streams of precipitating liquid and hot vapor, under such conditions as to vaporize and release the sulfur dioxid as the cellulose acetate is thus precipitated.

7. The method of obtaining cellulose acetate in easily treatable condition, which comprises producing a solution or like state of the cellulose acetate dispersed in liquid sulfur dioxid, discharging a stream of the same under pressure, and directing jets of precipitating liquid and hot vapor to strike said stream in the order named.

8. The method of obtaining cellulose esters of organic acids in easily treatable condition, which comprises producing a solution or like state of the cellulose ester dispersed in liquid sulfur dioxid, incorporating with said solution an amount of a coagulant sufficient to bring the solution toward the precipitating point, then delivering a stream of the resulting mixture, and commingling with said stream a stream of precipitating fluid to precipitate the cellulose ester.

9. The method of obtaining cellulose esters of organic acids in easily treatable condition, which comprises producing a solution or like state of the cellulose ester dispersed in liquid sulfur dioxid, incorporating with such solution an amount of a coagulant sufficient to bring the solution toward the precipitating point, then delivering a stream of the resulting mixture, and commingling with said stream a stream of precipitating fluid to precipitate the cellulose ester while supplying heat to the region of precipitation.

10. The method of obtaining cellulose esters of organic acids in easily treatable condition, which comprises producing a solution or like state of the cellulose ester dispersed in liquid sulfur dioxid, incorporating with said solution an amount of a coagulant sufficient to bring the solution toward the precipitating point, then delivering a stream of the resulting mixture, and commingling with said stream streams of precipitating liquid and hot vapor.

11. The method of obtaining cellulose esters of organic acids in easily treatable condition, which comprises producing a solution or like state of the cellulose ester dispersed in liquid sulfur dioxid, incorporating with such solution an amount of a coagulant sufficient to bring the solution toward the precipitating point, then delivering a stream of the resulting mixture, and commingling with said stream streams of water and steam.

12. The method of obtaining cellulose acetate in easily treatable condition, which comprises producing a solution or like state of the cellulose acetate dispersed in liquid sulfur dioxid, incorporating with such solution an amount of a coagulant sufficient to bring the solution toward the precipitating point, then delivering a stream of the resulting mixture, and commingling with said stream a stream of precipitating fluid to precipitate the cellulose acetate.

13. The method of obtaining cellulose acetate in easily treatable condition, which comprises producing a solution or like state of the cellulose acetate dispersed in liquid sulfur dioxid, incorporating with such solution an amount of a coagulant sufficient to bring the solution toward the precipitating point, then delivering a stream of the resulting mixture, and commingling with said stream streams of precipitating liquid and hot vapor.

14. In the manufacture of cellulose esters of organic acids, the steps which comprise producing a flowable cellulose ester reaction mixture including liquid sulfur dioxid, incorporating with such mixture an amount of a coagulant sufficient to bring the solution toward the precipitating point, then delivering a stream of the resulting mixture, and commingling with said stream a stream of precipitating fluid to precipitate the cellulose ester.

15. In the manufacture of cellulose esters of organic acids, the steps which comprise producing a flowable cellulose ester reaction mixture including liquid sulfur dioxid, incorporating with such mixture an amount of a coagulant sufficient to bring the solution toward the precipitating point, then delivering a stream of the resulting mixture, and commingling with said stream a stream of precipitating fluid to precipitate the cellulose ester while supplying heat to the region of precipitation.

16. In the manufacture of cellulose acetate, the steps which comprise producing a flowable cellulose acetate reaction mixture including liquid sulfur dioxid, incorporating with such mixture an amount of a coagulant sufficient to bring the solution toward the precipitating point, then delivering a stream of the resulting mixture, and commingling with said stream a stream of precipitating fluid to precipitate the cellulose acetate.

17. In the manufacture of cellulose acetate, the steps which comprise producing a flowable cellulose acetate reaction mixture including liquid sulfur dioxid, incorporating with such mixture an amount of a coagulant sufficient to bring the solution toward the precipitating point, then delivering a stream of the resulting mixture, and commingling with said stream a stream of precipitating fluid to precipitate the cellulose acetate while supplying heat to the region of precipitation.

18. In the manufacture of cellulose esters of organic acids, the steps which comprise producing a cellulose ester reaction mixture including liquid sulfur dioxid as a medium wherein the cellulose ester is dispersed, incorporating in said mixture before discharging it an amount of a coagulant sufficient to bring the cellulose ester toward the precipitating point, and then discharging the mixture into contact with precipitating liquid at a region where the sulfur dioxide is liberated as gas from within the precipitating cellulose ester.

19. In the manufacture of cellulose esters of organic acids, the steps which comprise subjecting material to be acylated to an acylation reaction in the presence of liquid sulfur dioxid as a medium, then subjecting the reaction mixture to a hydration treatment, the reaction mixture being held under pressure during acylation and hydration, incorporating in the hydrated mixture before discharging it from the pressure region an amount of a coagulant sufficient to bring the cellulose ester toward the precipitating point, and then discharging the mixture into contact with precipitating liquid at a region where the sulfur dioxide is liberated as gas from within the precipitating cellulose ester.

20. The product consisting of a cellulose ester of an organic acid precipitated in disrupted, fibrous condition.

21. The product consisting of cellulose acetate precipitated in disrupted, fibrous condition.

DONALD B. MASON.